Aug. 16, 1949.　　　　　W. G. COOK　　　　　2,479,317
CONTROL SYSTEM
Filed July 7, 1944　　　　　　　　　　　　2 Sheets-Sheet 1

WITNESSES:
E. A. McCloskey
G. V. Golma

INVENTOR
Willard G. Cook.
BY G. M. Crawford
ATTORNEY

INVENTOR
Willard G. Cook.

Patented Aug. 16, 1949

2,479,317

UNITED STATES PATENT OFFICE 2,479,317

CONTROL SYSTEM

Willard G. Cook, Wilkinsburg, Pa., assignor to Westinghouse Electric Corporation, East Pittsburgh, Pa., a corporation of Pennsylvania Application July 7, 1944, Serial No. 543,838

11 Claims. (Cl. 318—142)

My invention relates, generally, to control systems and has reference in particular to control systems for controlling the electrolytic treatment of continuously moving lengths of material.

Generally stated, it is an object of my invention to provide a control system for an electrolytic process which is simple and inexpensive to manufacture, and which is flexible and accurate in operation.

More specifically, it is an object of my invention to provide for controlling the current in an electrolytic process in predetermined relation to the speed of the material which is being treated.

Another object of my invention is to provide for controlling the rate of deposit of material on a continuously moving length of material which is being electroplated withouth preventing variations in the speed of travel of the strip.

Yet another object of my invention is to provide for controlling the current in an electroplating process so as to vary the current relative to the speed of travel in any of a number of different relations under different speed conditions of the material which is being plated.

Still another object of my invention is to provide for controlling the alternating-current input to a plurality of rectifiers supplying current to electroplating cells in accordance with the speed of the material being plated and in accordance with the input current of the rectifiers.

It is also an object of my invention to provide for controlling the energization of a saturable reactor controlling the alternating current input to an electroplating rectifier in different predetermined relations to the operating speed of the material being plated.

A further object of my invention is to provide for regulating the alternating current input to a plurality of electroplating rectifiers in accordance with control voltages which are proportional to the speed of travel of the material being plated and to the plating current.

Other objects will, in part, be obvious and will, in part be explained hereinafter.

In practicing my invention, the plating current supplied to the upper and lower cells of a continuous strip plating line is controlled by saturable reactors in the input circuits of the rectifiers. The reactors are controlled by voltages from the main generator supplying electrical energy to the strip driving motor, and from booster exciters which are controlled by regulators responsive to control voltages derived from a speed indicating pilot exciter and from current transformers on the input sides of the rectifiers. Potentiometers associated with the pilot exciter and a source of bias voltage permit changing the voltages applied to the regulators so as to vary the plating currents of the cells relative to each other and to the speed of the strip.

For a more complete understanding of my invention, reference may be made to the following detailed description which may be read in connection with the accompanying drawings in which.

Figure 1:
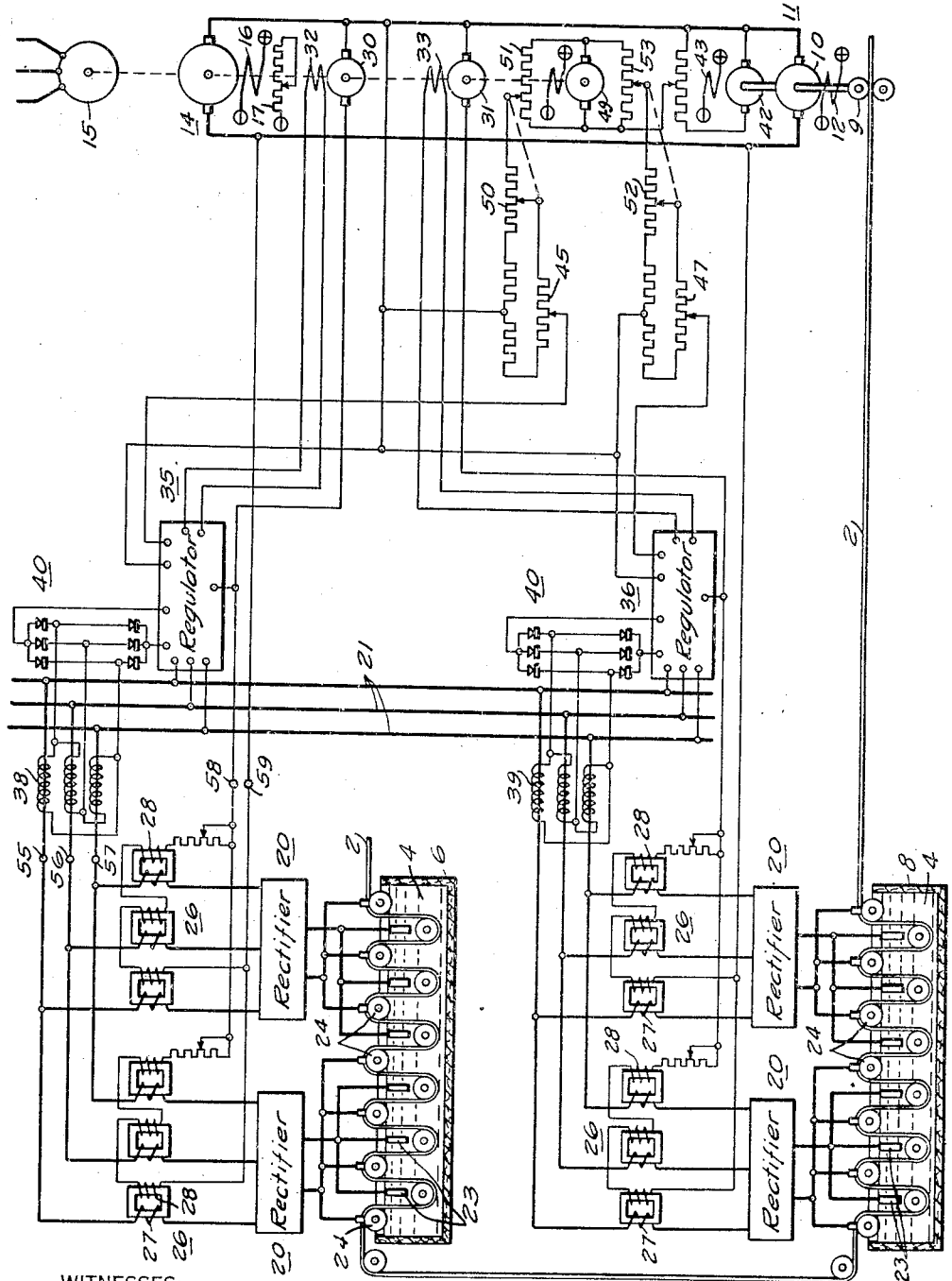
Figure 1 is a diagrammatic view of an electrolytic plating system embodying the principle features of one embodiment of my invention.

Referring to Fig. 1, the reference numeral 2 may indicate a substantially continuous strip of material which may be drawn through an electrolyte 4 in plating cells 6 and 8 of a tinning line in order to plate the lower and upper sides of the strip separately, by means of rolls 9 which may be operatively connected to the armature 10 of a variable speed driving motor 11. Operation of the driving motor 11 may be effected by connecting the field winding 12 to a suitable source of excitation and applying a variable voltage to the armature by means of a main generator 14. The generator 14 may be driven by an alternating current motor 15 and provided with a field winding 16 having a field rheostat 17 for varying the excitation thereof in order to vary the armature voltage.

Plating current may be supplied to the plating cells 6 and 8 by suitable rectifier means such as the polyphase rectifier units 20, which may be connected to a source of alternating current represented by the conductors 21 and to the plating cells by means of electrodes 23 and current conducting rolls 24 over which the strip 2 passes. In order to control the plating current, means such as the saturable reactors 26 may be provided, having alternating current windings 27 connected between the rectifiers 20 and the alternating current conductors 21, and direct current control windings 28.

The base energization of the control windings 28 may be provided by the main generator 14, since the voltage of the main generator will be substantially proportional to the speed of the driving motor and hence the speed of the strip 2. The principal control of the plating current may be provided by means of control generators 30 and 31 which may be connected in series circuit relation with the control windings 28 of the reactors associated with the plating cells 6 and 8, and provided with field windings 32 and 33 for controlling the energization of the control windings thereof.

With a view to regulating the plating currents in the cells 6 and 8 and maintaining definite predetermined relations between the plating currents thereof and the speed of the strip 2, means such as the regulators 35 and 36 may be provided. The field windings 32 and 33 of the control generators may be energized under the control of their respective regulators which may be disposed to operate in accordance with control voltages proportional to the plating currents and to the speed of the strip. Voltages proportional to the plating currents may be provided by means of current transformers 38 and 39 connected on the input sides of the rectifiers 20 in conjunction with suitable rectifying means 40.

A contol voltage proportional to the speed of the strip 2 may be provided for both of the regulators by means of a pilot exciter 42 connected to the driving motor 11 and provided with a field winding 43 which may be energized from a substantially constant source of voltage.

Potentiometers 45 and 47 may be utilized for controlling the values of the speed responsive voltages applied to the regulators 35 and 36 in order to maintain different predetermined relations between the current and speed with respect to each of the plating cells.

In order to maintain other than a given predetermined relation between the current and speed under varying conditions of speed, suitable means may be provided for supplying a substantially constant bias voltage to each of the regulators in series circuit relation with the speed responsive control voltage from the pilot exciter 42. For example, a bias generator 49 may be provided in connection with taper and bias control potentiometers 50, 51, 52 and 53 respectively, as shown.

Figure 2:
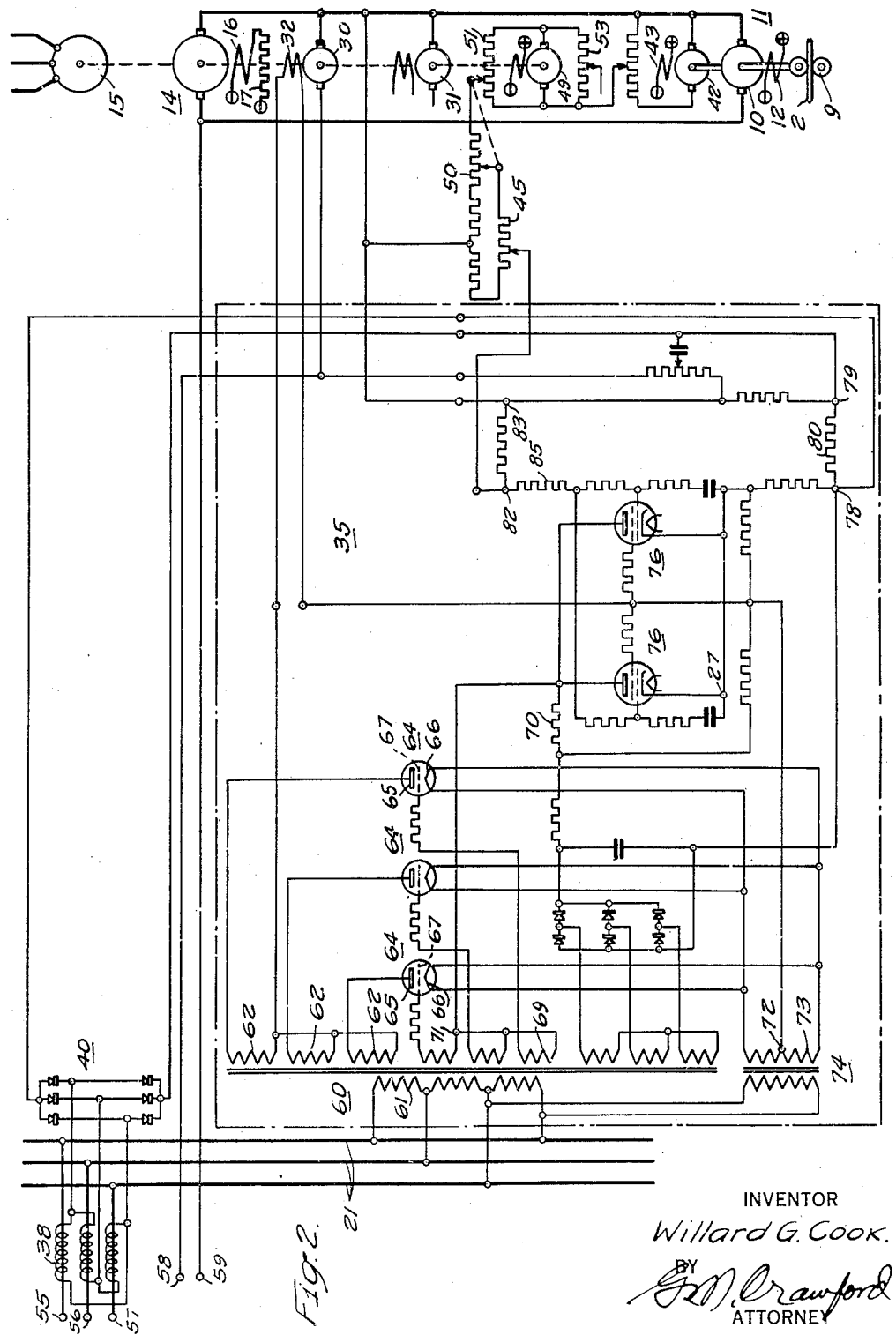
Fig. 2 is a diagrammatic view of a portion of the system showing the current control system in detail.

Since the regulators 35 and 36 and the control circuits associated therewith are substantially identical, the description and operation of the regulators will be limited to that of the regulator 35, which is shown in detail in Fig. 2 and provided with terminal points 55 through 59 which correspond to similar terminal points in the system shown in Fig. 1.

Referring to Fig. 2, it will be seen that the regulator 35, shown in detail therein, may comprise a transformer 60 having a primary winding 61 disposed to be connected to the alternating current conductors 21, and a plurality of secondary windings 62 which may be disposed to supply direct current to the field winding 32 of the control generator 30 through a plurality of electric valves 64 having anodes 65, cathodes 66 and control grids 67. Control of the valves 64 may be obtained by varying the voltage on their control grids 67. This voltage may comprise the resultant between an alternating current voltage supplied by control windings 69 of the transformer 60 and a negative bias direct current voltage which appears across the control resistor 70 connected between the terminal point 71 of the winding 69 and the midpoint 72 of the secondary winding 73 of a transformer 74 which supplies current to the cathodes 66 of the valves 64.

The direct current control voltage across the control resistor 70 may be varied by changing the conductivity of a pair of control valves 76. This result is obtained by connecting the terminal points 78 and 79 of the regulator to the rectifier means 40 which furnish a direct current control voltage from the current transformer 38 proportional to the alternating current input to the plating rectifiers 20. This voltage appears across a control resistor 80 which is connected in the grid circuit of the valve 76 in such a manner as to make the bias voltage on the control grid thereof more positive when the current input increases.

Accordingly, the conductivity of the control valves 76 increases, as does the negative control voltage across the control resistor 70. This decreases the output of the valves 64 and reduces the voltage of the control generator 30. Accordingly, the control windings 28 of the saturable reactors 26 are energized at lower levels, so that the impedance of the reactors increases, thereby decreasing the alternating current input to the plating rectifiers 20, and hence reducing the plating current to the desired value.

Control of the plating current in accordance with the speed of the strip 2 may be obtained by connecting the terminal points 82 and 83 of the regulator across the pilot exciter 42 and the bias generator 49 through the current control potentiometer 45, the taper potentiometer 50 and the taper bias potentiometer 51. This connection places a variable control voltage across the control resistor 85 which is connected in the grid circuit of the control valves 76 in such a direction as to make the bias voltage on the control valves 64 more negative whenever the speed of the strip 2 increases.

Accordingly, the current through the valves 76 decreases, producing a lower voltage across the control resistor 70. This decreased negative bias voltage increases the conductivity of the valves 64 so that the energization of the field winding 32 of the control generator is likewise increased. The control voltage applied to the control windings 28 of the saturable reactors 27 through the terminal points 58 and 59 is thereby increased, causing saturation of the reactors, and permitting increased output of the rectifiers 20 to the plating cells in accordance with the increased speed. By operating the taper and bias control potentiometers 50 and 51 the relations between the current and speed may be made to vary automatically in accordance with the speed, so as to obtain different ratios between the current and speed at different speeds. The ratios between the currents supplied to the cells 6 and 8 may also be varied independently of each other by operating the current control potentiometer 45 and 47 so as to change the rates of deposit on opposite sides of the strip 2 relative to each other.

From the above description and the accompanying drawings, it will be apparent that I have provided, in a simple and effective manner, for maintaining different predetermined current relations between the plating currents of the upper and lower cells for plating the opposite sides of a substantially continuous strip or length of material in an electroplating process. I have also provided, in a simple and effective manner, for regulating the plating current of the upper and lower cells jointly so as to maintain different relations thereof with the speed of the strip through the cells. In addition, the relationship of the currents and the speed may be alternately changed to different predetermined relations in accordance with different speeds of travel of the strip through the cells, Accordingly, variations in the speed of the strip may be easily effected so as to provide for acceleration and deceleration of the strip during the plating process while still maintaining predetermined desired relations between the current and speed for all values of speed.

Since certain changes may be made in the above-described construction and different embodiments of the invention may be made without departing from the spirit and scope thereof, it is intended that all the matter contained in the above description and shown in the accompanying drawings will be considered as illustrative and not in a limiting sense.

I claim as my invention:

1. In a control system for use with an electric motor disposed to move a strip of material, a variable voltage generator controlling the speed of the motor, rectifier means supplying current to the strip, saturable reactor means having a control winding connected to be energized by the variable voltage generator for basically controlling the current supplied to the rectifier means from an alternating-current source, a booster generator connected in series circuit relation with the variable voltage generator and the control winding and having a field winding, and regulating means operable to produce a control voltage jointly responsive to the current supplied to the rectifier means and the speed of the driving motor for varying the excitation of the booster generator to maintain the current in predetermined relation to the speed.

2. In a control system for use with electroplating apparatus wherein a strip of material is moved lengthwise by a driving motor through a pair of electroplating cells for plating the opposite sides thereof in succession, means for applying a variable voltage to the driving motor for changing the speed of the strip, rectifier means connected to supply direct current to the strip from an alternating-current source, saturable reactor means controlling the alternating current inputs to each of the rectifier means, said reactor means having control windings connected to be energized by the variable voltage applied to the driving motor for obtaining basic control of the direct current, a pair of variable voltage booster generators for applying variable control voltages to the control windings of each of the saturable reactor means, circuit means producing a control voltage proportional to the speed of the strip, additional circuit means producing control voltages proportional to the currents supplied by the rectifier means, regulating means independently controlling the booster generators in accordance with the speed and current responsive control voltages for obtaining vernier control of the direct current supplied to the strip, and circuit means for changing the proportion between the currents supplied by each of the rectifier means.

3. In a control system for use with electroplating apparatus, in combination, a plurality of rectifier means for supplying direct current to a plating cell from a source of alternating current for plating a moving strip of material control means basically controlling the current continuously in accordance with the speed of the strip of material, circuit means producing a control voltage proportional to the speed of the strip, additional circuit means producing a direct current control voltage proportional to the alternating current input to the rectifier, and a plurality of sensitive electronic regulators responsive to said control voltages operable to control the operation of the control means to effect vernier control of the input current of the rectifier means in accordance with the speed of the strip.

4. For use in an electroplating system for plating a continuous strip of material, an electric motor energized from a variable voltage source for moving the strip at different speeds, rectifier means supplying direct current to the strip from an alternating-current source, saturable reactor means controlling the input current of the rectifier means and having direct-current windings energized from the variable voltage source, means producing a control voltage proportional to the speed of the strip, additional means producing a control voltage proportional to the input current of the rectifier means, and regulating means jointly responsive to said control voltages operable to vary the energization of the saturable reactor direct-current windings from the variable voltage source.

5. In a control system, a motor operable to effect movement of a length of conductive material, a variable voltage generator for effecting operation of the motor at different speeds, a plurality of rectifier devices for supplying direct current to the material from an alternating-current source, means for varying said direct current in accordance with the voltage of said generator, and means further controlling the direct current supplied to the material in accordance with the speed of the material and the current to which the material is subjected.

6. In a control system for a strip of conductive material actuated by a motor energized from a source of variable voltage, a plurality of rectifier devices for supplying direct current to the material from an alternating-current source, saturable reactor means having control windings energized from the variable voltage source for continuously controlling the alternating current supplied to the rectifier means in accordance with the voltage applied to said motor, and circuit means for varying the energization of the direct-current control windings further in accordance with the alternating-current input to the rectifier devices and with the speed of travel of a length of material through the process to maintain predetermined relations between the current and speed.

7. The combination with a driving motor disposed for moving a strip of material, of a plurality of rectifier means for supplying current to the strip, means for supplying a variable voltage to the driving motor, saturable reactor means controlling the alternating-current input to the rectifier means from an alternating-current source, said reactor means having a saturating control winding connected so as to be energized from the variable voltage means for basically controlling the current supplied to the strip, control means operable to modify the control voltage applied to the control winding from the variable voltage means, and regulating means jointly responsive to the speed of the driving motor and the input to the rectifier means controlling the operation of the control means to provide vernier control of the current supplied to the strip.

8. A control system for supplying current to a length of material which is arranged to be moved by an electric motor comprising, means connected for supplying a variable voltage to the motor to vary the speed thereof, rectifier means for subjecting the length of material to a direct current, control means responsive to the variable voltage applied to the motor for effecting basic control of said current, means producing a control voltage proportional to the current supplied by the rectifier means, additional means producing a control voltage proportional to the speed of the length of material, regulating means jointly responsive to said control voltages for modifying the response of the control means to provide vernier control and maintain the current in predetermined ratio to the speed of the material, and means for applying a bias control voltage to the regulating means for maintaining different predetermined relations between the current and material speed at different speeds.

9. In a control system, rectifier means connected to supply a direct current from an alternating-current source for plating a strip of material, a saturable reactor having an alternating-current winding connected in circuit relation with said source and rectifier means and having a direct-current control winding, a motor energized from a variable voltage source operatively connected to move said strip, circuit means connecting the direct-current control winding to the variable voltage source, and control means including a sensitive regulating device responsive to the speed of the strip and the direct current supplied for plating the strip connected to modify the energization of the control winding from the variable voltage source.

10. In a control system for a main rectifier device connected to supply plating current from an alternating-current source for plating a strip of material, a saturable reactor having an alternating-current winding connected in circuit relation with the rectifier device and the alternating-current source and having a direct-current control winding connected to receive its base energization from a source of electrical energy, a booster generator connected in series circuit relation with the control winding and said source, means including a current transformer connected between the main rectifier device and the alternating-current source and auxiliary rectifier means having operating characteristics similar to those of the main rectifier means for producing a direct-current control voltage proportional to the plating current, means producing a direct-current control voltage proportional to the speed of the strip, and sensitive regulating means responsive differentially to said control voltages for controlling the output voltage of the booster generator to vary the energization of the reactor direct-current control windings to control the plating current in accordance with the speed of the strip.

11. A control system for use with electroplating apparatus wherein a strip of conductive material to be plated is moved through an electroplating cell at varying speeds comprising, circuit means including a plurality of rectifier means supplying direct current to the strip of material from an alternating current source, saturable reactor means connected to control the alternating current input to each of the rectifier means, said reactor means having control windings, circuit means connected to effect base energization of the control windings in accordance with the speed of the strip of material, a booster generator connected to vary the energization of the control windings from said base energization, control means disposed to produce a voltage proportional to the speed of the strip of material, current transformer means producing a control voltage proportional to the alternating current input to the rectifier means from the alternating-current source, and sensitive electronic regulating means responsive to voltages from the control means and the current transformer means connected to control the output of the booster generator to effect vernier control of the current supplied to the strip of material and maintain predetermined relations between the current supplied to the strip of material and the speed of the strip of material.

WILLARD G. COOK.

REFERENCES CITED

The following references are of record in the file of this patent:

UNITED STATES PATENTS

| Number | Name | Date |
|---|---|---|
| 1,068,411 | Chubb | July 29, 1913 |
| 1,668,711 | Evans | May 8, 1928 |
| 1,961,197 | Churchward | June 5, 1934 |
| 1,965,399 | Wehe | July 3, 1934 |
| 2,064,589 | Covers | Dec. 15, 1936 |
| 2,322,130 | Hedding | June 15, 1943 |
| 2,325,401 | Hurlston | July 27, 1943 |